United States Patent [19]
Tieleman et al.

[11] Patent Number: 5,873,774
[45] Date of Patent: Feb. 23, 1999

[54] POULTRY LUNG REMOVAL APPARATUS

[75] Inventors: Rudolf J. Tieleman, Kansas City, Kans.; Lincoln Simon Langhorn, Kansas City, Mo.

[73] Assignee: Johnson Food Equipment, Inc., Kansas City, Kans.

[21] Appl. No.: 659,225

[22] Filed: Jun. 4, 1996

[51] Int. Cl.$^6$ .................................................. A22C 21/06
[52] U.S. Cl. .......................................... 452/116; 452/118
[58] Field of Search .................................... 452/116, 106, 452/107, 117, 118

[56] References Cited

U.S. PATENT DOCUMENTS

| | | |
|---|---|---|
| 3,555,593 | 1/1971 | Scheier . |
| 3,653,093 | 4/1972 | Scheier . |
| 3,798,708 | 3/1974 | Scheier . |
| 3,802,028 | 4/1974 | Scheier et al. . |
| 3,992,752 | 11/1976 | Harben, Jr. et al. ................. 452/116 |
| 4,004,320 | 1/1977 | Scheier et al. . |
| 4,262,387 | 4/1981 | Scheier et al. . |
| 4,564,977 | 1/1986 | Scheier et al. . |
| 4,677,709 | 7/1987 | Dixon ................................... 452/116 |
| 4,899,421 | 2/1990 | Van Der Eerden ................. 452/116 |
| 4,918,787 | 4/1990 | Hazenbroek ......................... 452/116 |
| 5,098,334 | 3/1992 | Molaug ................................. 452/116 |
| 5,167,568 | 12/1992 | Esbroeck et al. ................... 452/116 |

Primary Examiner—Willis Little
Attorney, Agent, or Firm—Hovey, Williams, Timmons & Collins

[57] ABSTRACT

A poultry processing machine has a suction tube for use in extracting an organ from a membrane-covered socket in the body cavity of a poultry carcass. The tube is connectable with a source of vacuum pressure and provided with an intake opening through which the organ is passes as it is sucked into the tube. A sharp tooth inside the suction tube is disposed for breaking the membrane during extraction of the organ.

16 Claims, 5 Drawing Sheets

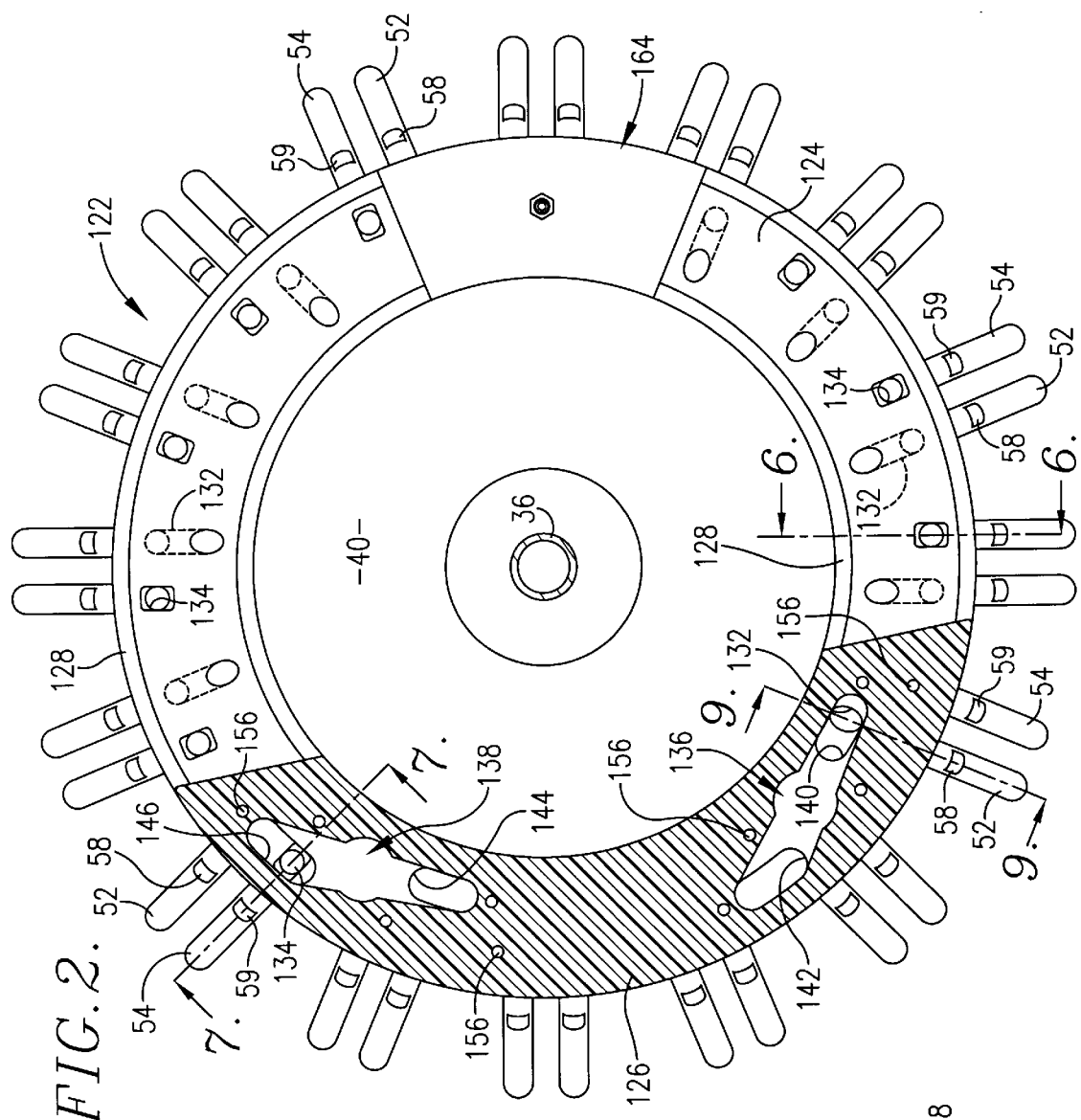
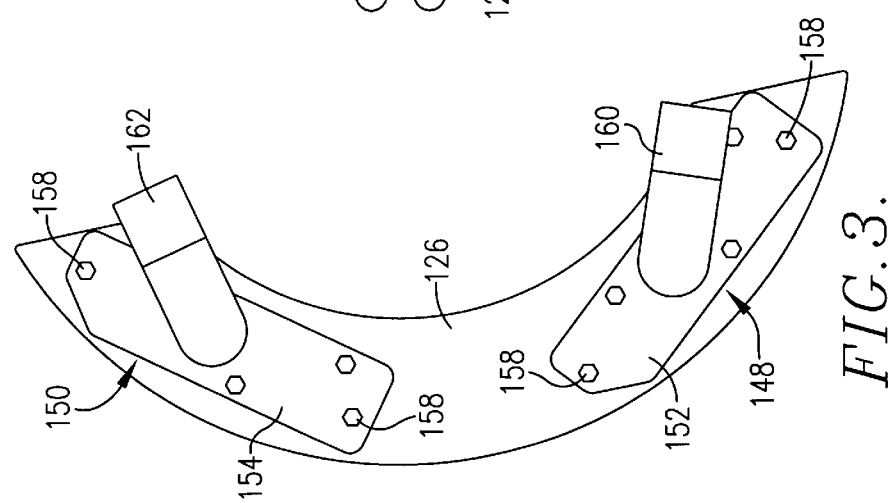

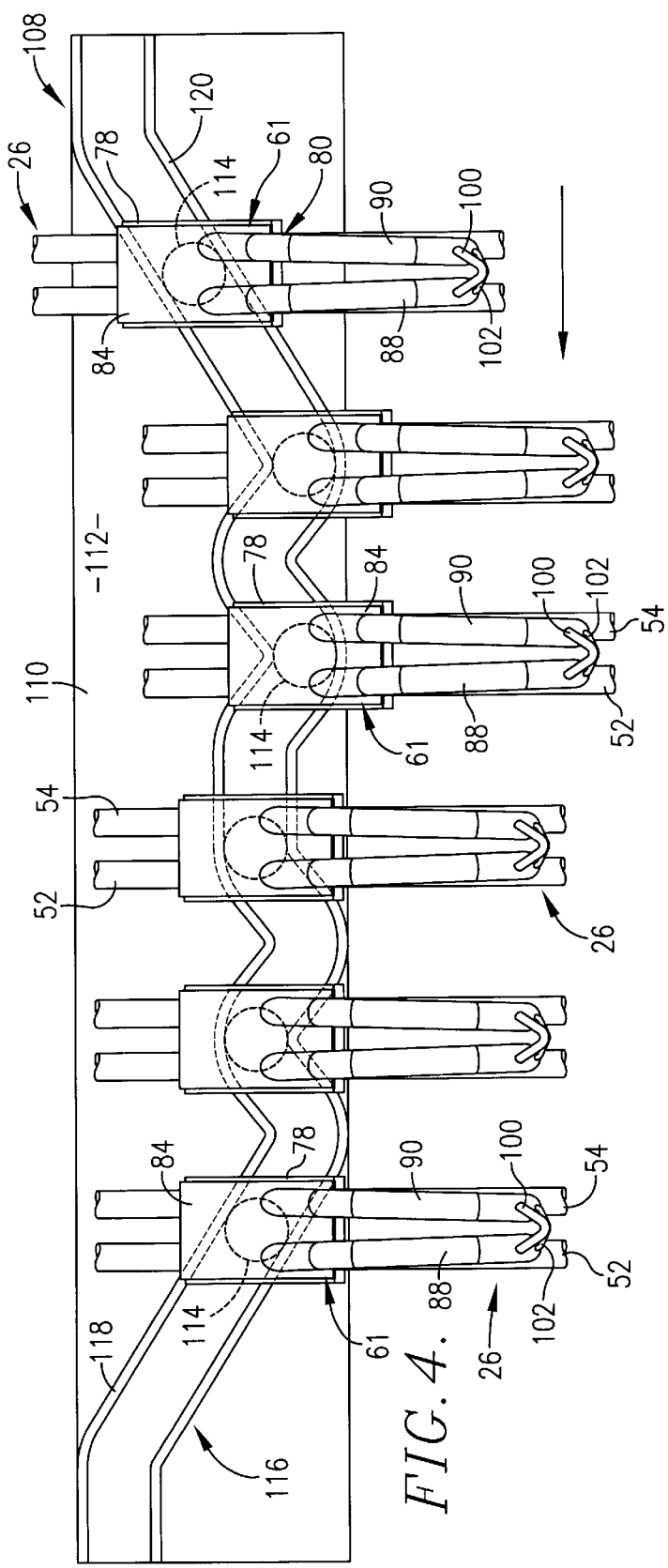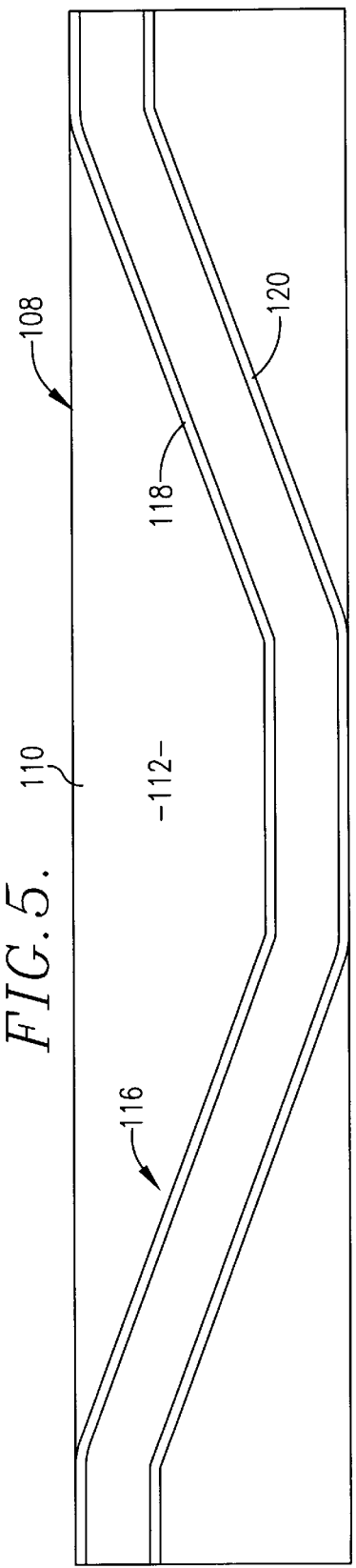
FIG. 4.
FIG. 5.

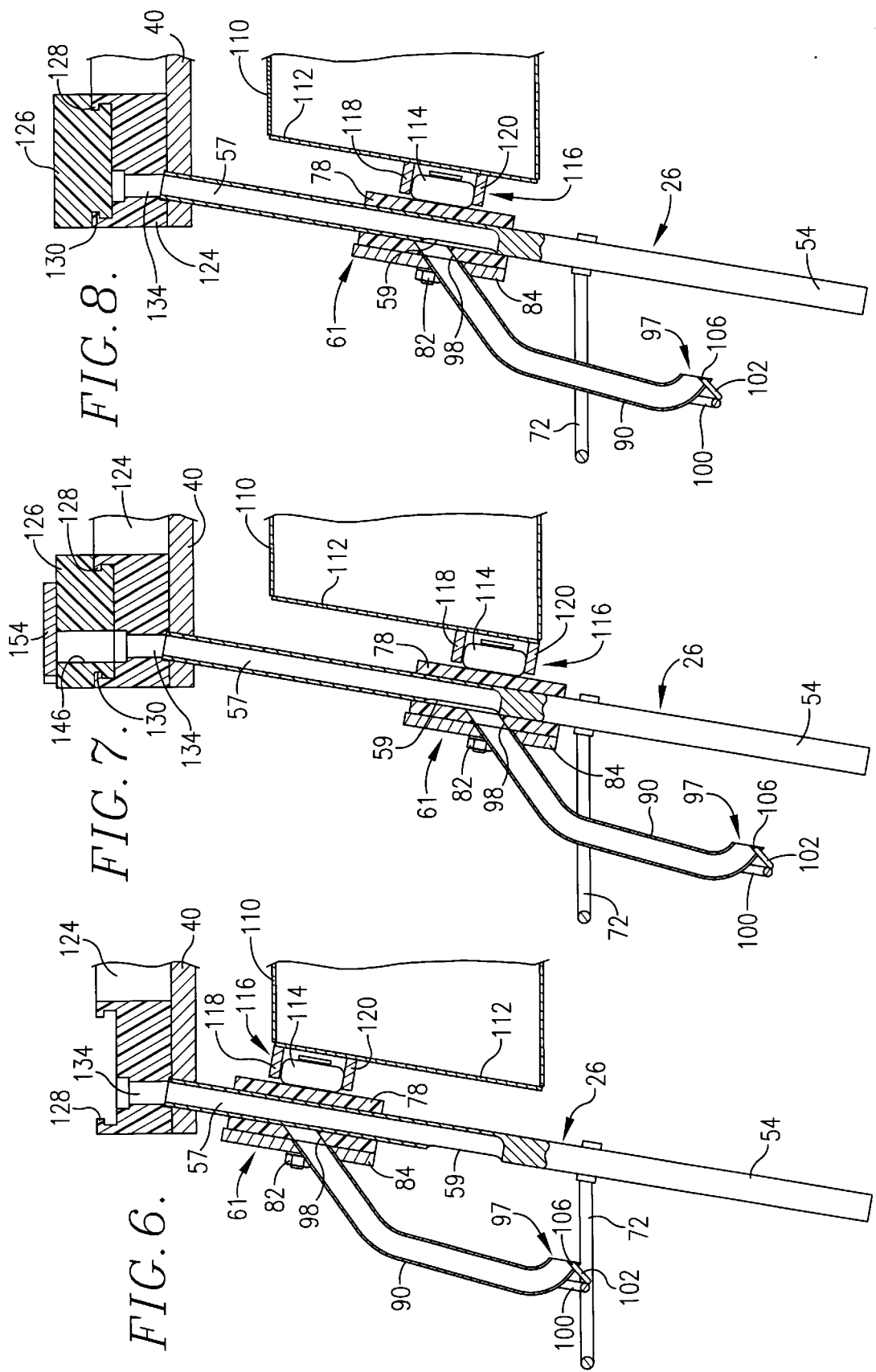

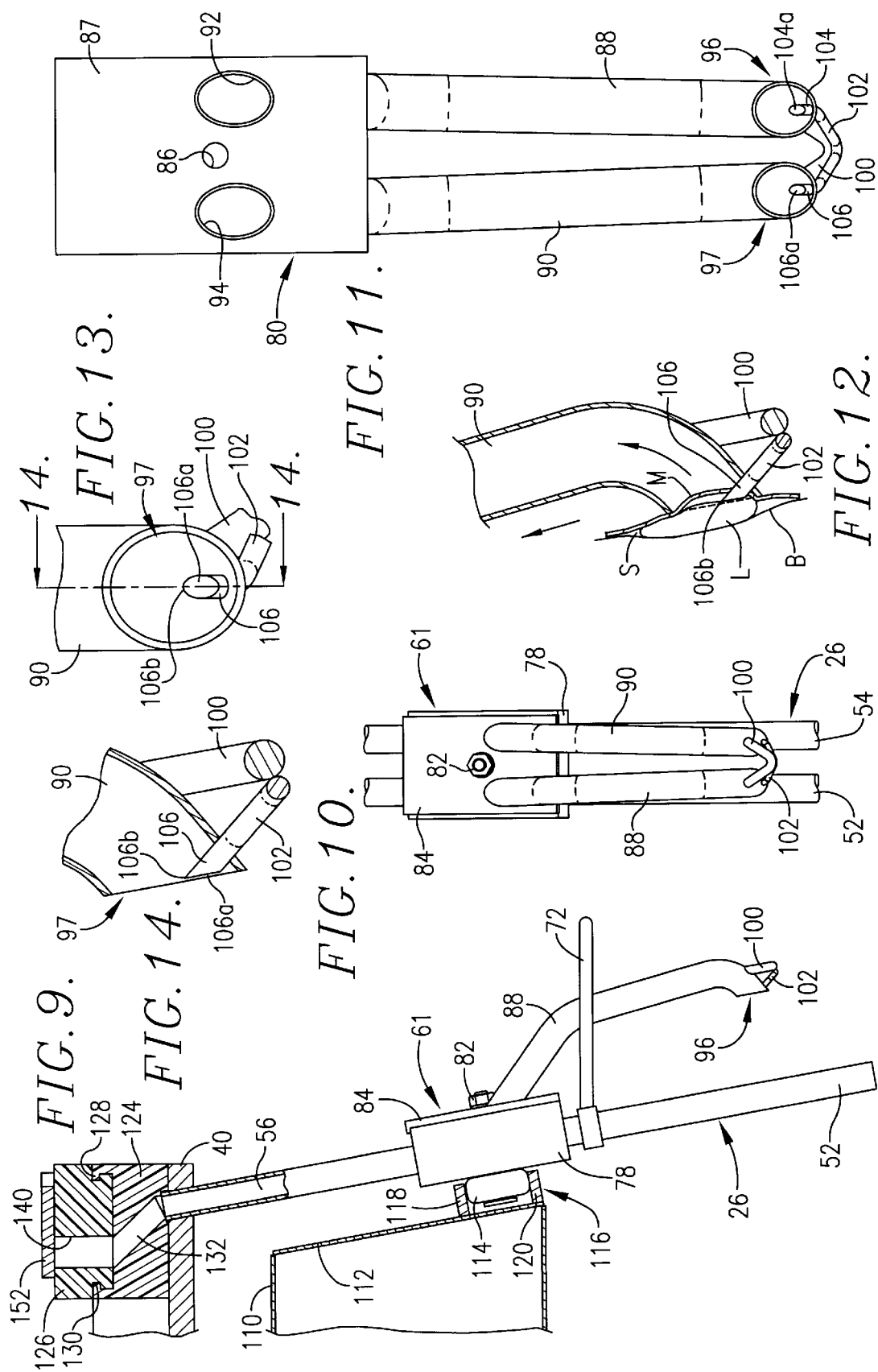

POULTRY LUNG REMOVAL APPARATUS

BACKGROUND OF THE INVENTION

1. Field of the Invention

The present invention relates generally to poultry processing equipment and more particularly, to an improved evisceration device for removing organs from a membrane-covered socket in the body cavity of a poultry carcass, such as the lungs.

2. Discussion of Prior Art

The lungs and kidneys of a poultry carcass are disposed on opposite sides of the backbone in sockets covered with a tissue film or membrane. Of course, it is important that these organs be dislodged and removed from the carcass during the evisceration process. However, removal of organs disposed within membrane-covered sockets with conventional evisceration devices presents several problems, as will be set forth hereinbelow.

Conventional processing devices often utilize a large eviscerating tool, such as a spoon, for scooping the organs and entrails from the body cavity of a poultry carcass. Typically, the tool is inserted through a previously cut abdominal opening in the carcass and into the body cavity, wherein the tool applies pressure on the viscera in a direction away from the breasts and drags the viscera along the backbone and out of the carcass. The tool is usually designed to grab and pull the heart, which is relatively exposed within the cavity in a position readily accessible by the tool. It is expected that the blood vessels interconnecting the heart and lungs will cause the lungs to be pulled by the tool and removed from the cavity, along with the heart.

This type of evisceration device is problematic for various reasons. The membrane covering the lungs, unless broken, will often prevent removal of the lungs. The spoon-like tool does not effectively and reliably break the membrane covering the lungs. Although the pulling force exerted on the vessels interconnecting the heart and lungs may be sufficient to tear the membrane as the lungs are pulled from their respective sockets, the vessels have a tendency to tear, in which case the lungs remain in the sockets. Even if the vessels remain intact, the lungs have a tendency to tear, whereby a portion of the lung may be left in the socket.

Evisceration devices have been specifically designed for removing the lungs from the body cavity of a poultry carcass in a machine separate from the machine for removing the remaining viscera. Conventional lung removal devices typically include a tubular vacuum tool having a pair of intake openings, with the tool being inserted through the abdominal opening and into the body cavity for positioning the openings in overlying relationship with the membrane-covered sockets. A source of vacuum pressure communicates with the openings for sucking the lungs from the sockets.

It is important that the vacuum pressure be precisely controlled so as to prevent inadvertent removal or damage of other organs or body parts. Preferably, the source of vacuum pressure and intake openings are not intercommunicated until the latter are positioned over the sockets. Moreover, the vacuum pressure must be amply low to prevent removal or damage to the carcass and body parts surrounding the sockets. In some instances, however, the vacuum pressure tends to be insufficient to break the membrane covering the lungs. Vacuum tools have been provided with scrapers projecting outwardly in locations adjacent the intake openings for scraping the carcass on opposite sides of the backbone. Such tools are reciprocated along a generally vertical path of travel within the body cavity, with the scrapers contacting and scraping along the membranes. Accordingly, the scrapers are provided to rip and tear the membrane for facilitating removal of the lungs.

However, the lung removal device also presents several problems. Particularly, the scrapers tend to mutilate the lungs so that the lungs are not sucked whole from the socket, whereby fragments of the lung often remain in the body cavity. The scrapers also have a tendency to damage the carcass surrounding the sockets, which is unsightly and adverse to the salability of the bird. Furthermore, the force of the scrapers along the backside of the carcass often breaks the bones in close proximity to the sockets (i.e., the ribs). Broken bones and splintered bone chips are dangerous to consumers and are also unsightly and adverse to salability of the bird.

OBJECTS AND SUMMARY OF THE INVENTION

Responsive to these problems, an important object of the present invention is to provide an improved evisceration device for effectively and reliably removing organs from a membrane-covered socket in the body cavity of a poultry carcass. It is also an object of the present invention to provide such a device for use in a high speed, mechanized poultry processing system. A further object of the present invention is to provide a vacuum removal tool for extracting organs from a membrane-covered socket, wherein the tool does not damage or break the body parts surrounding the socket, so that the process of removing the organs does not adversely affect the appearance or salability of the bird. Yet a further object of the present invention is to provide a vacuum tool having structure for breaking the membrane covering the organ, without having to scrub or scrape the membrane.

In accordance with these and other objects evident from the following description of a preferred embodiment of the invention, the processing machine includes a suction tube for use in extracting an organ from a membrane-covered socket in the body cavity of a poultry carcass. The tube is provided with an intake opening through which the organ passes as it is sucked into the tube. Structure provided inside the suction tube is disposed for breaking the membrane during extraction of the organ. In this respect, the tube may be devoid of scrapers projecting outwardly from the intake opening. In most instances, the suction tube is utilized in a high speed, mechanized processing machine.

Preferably the structure comprises a tooth having a sharp point for piercing the membrane when the membrane is sucked into the tube through the intake opening. The preferred tooth is generally cylindrical, with a beveled end, to present a generally elliptical end face having the sharp point positioned along the marginal edge thereof The preferred tube has an open planar end defining the intake opening, with the open end being substantially parallel to the end face of the tooth. The end face is spaced slightly inwardly from the open end of the tube. In instances where the tube has a generally upward path of travel during extraction of the organ, the sharp point preferably projects generally upwardly for facilitating piercing of the membrane.

BRIEF DESCRIPTION OF THE DRAWING FIGURES

A preferred embodiment of the invention is described in detail below with reference to the attached drawing figures, wherein:

FIG. 2 is an enlarged, horizontal cross-sectional view taken along line 2—2 of FIG. 1, particularly illustrating the stationary vacuum block and relatively rotatable manifold ring;

FIG. 3 is an enlarged, top plan view of the vacuum block which fits slidably, yet sealingly, to the top of the manifold ring illustrated in FIG. 2;

FIG. 4 is an enlarged, fragmentary front elevational view of a stationary drum having an operating cam track for the vacuum tool, particularly illustrating the region of the cam track associated with the various operating strokes of the tool during removal of the lungs;

FIG. 5 is an enlarged elevational view of the opposite side of the drum, particularly illustrating the region of the operating cam track corresponding to the washing station of the machine;

FIG. 6 is an enlarged, fragmentary vertical cross-sectional view taken along line 6—6 of FIG. 2, particularly illustrating the position of one of the suction tubes of the vacuum tool before it is inserted into the body cavity of the poultry carcass;

FIG. 7 is an enlarged, fragmentary vertical cross-sectional view taken along line 7—7 of FIG. 2, particularly illustrating the one suction tube in its lowermost position and intercommunicated with the vacuum chamber via the hollow guide rod and manifold ring;

FIG. 8 is an enlarged, fragmentary vertical cross-sectional view of the one suction tube as it moves about the drum between the two vacuum chambers of the vacuum block, particularly illustrating the passageway defined in the manifold ring being blocked off by the solid portion of the vacuum block;

FIG. 9 is an enlarged, fragmentary vertical cross-sectional view taken substantially along line 9—9 in FIG. 2, particularly illustrating the other suction tube in its lowermost position and intercommunicated with the vacuum chamber via the hollow guide rod and manifold ring;

FIG. 10 is an enlarged, fragmentary front elevational view of the suction assembly supported on the guide rods of the fixture by a supporting block;

FIG. 11 is an enlarged, rear elevational view of the suction assembly removed from the fixture;

FIG. 12 is an enlarged, fragmentary side elevational view of the lower end of one of the suction tubes of the vacuum tool, particularly illustrating the tooth piercing a membrane covering a lung;

FIG. 13 is an enlarged, fragmentary rear elevational view of the open intake end of the suction tube illustrated in FIG. 12, particularly illustrating the location of the tooth within the opening; and FIG. 14 is an enlarged, vertical cross-sectional view taken along line 14—14 in FIG. 13.

DETAILED DESCRIPTION OF THE PREFERRED EMBODIMENT

Figure 1:
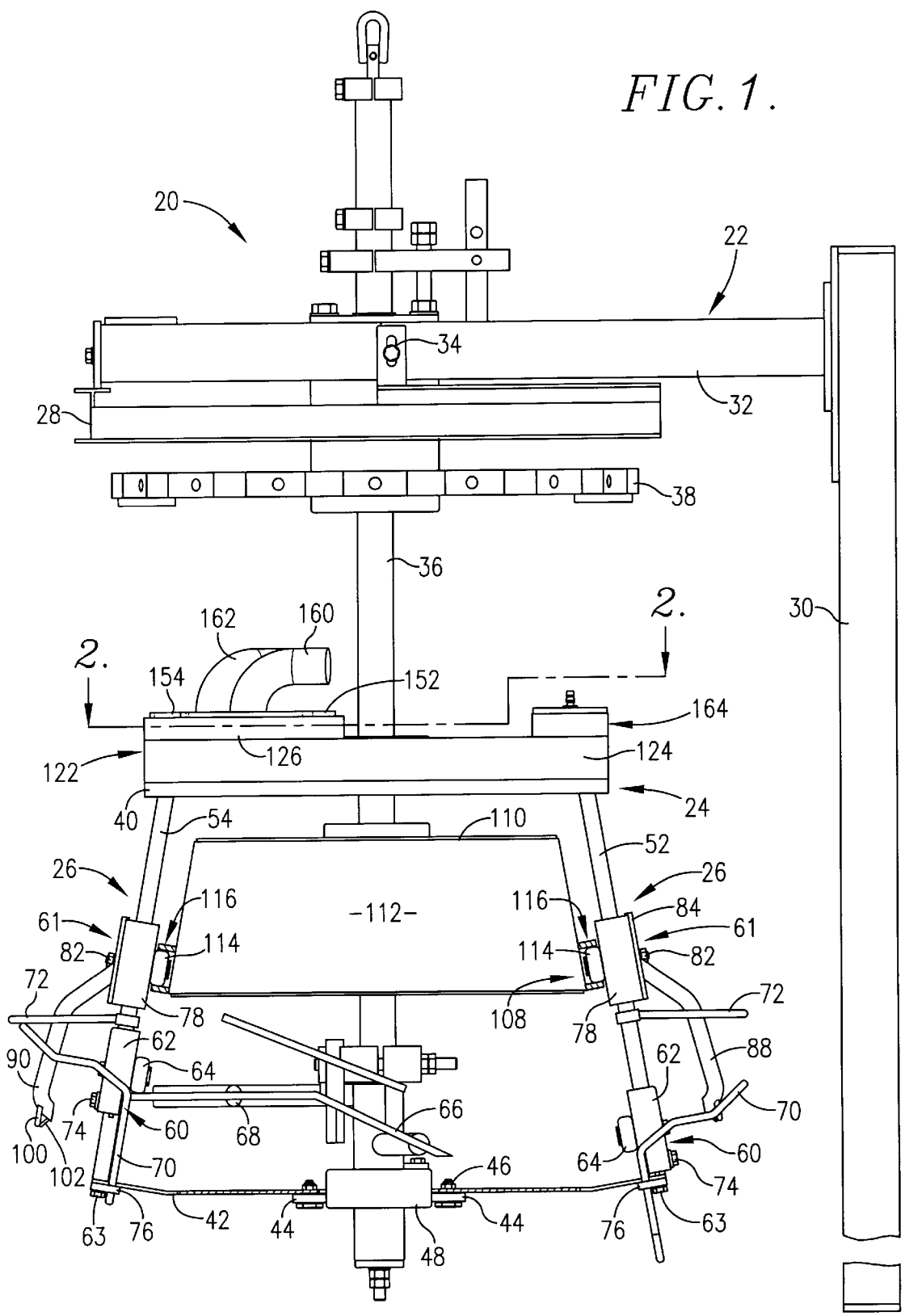
FIG. 1 is a fragmentary, side elevational view of a poultry processing machine for removing lungs from the body cavities of a succession of poultry carcasses, such machine employing a number of fixtures spaced circumferentially about a rotary carousel, with each fixture including an improved vacuum tool constructed in accordance with the present invention.

Turning now to FIG. 1, the poultry processing machine 20 selected for illustration is configured for use with a high speed overhead conveyor line (not shown) which conveys a succession of poultry carcasses (not shown) suspended from their hocks through the processing machine 20. The illustrated machine generally includes a stationary support frame 22, a carousel 24 mounted on the frame for rotation about a generally upright axis in coordination with the conveying line, and a plurality of carcass fixtures 26 mounted on the carousel 24 for receiving carcasses in succession from the conveyor line and performing a lung removal operation on the carcasses as the fixtures move with the carousel about the upright axis. The principles of the present invention, however, are equally applicable to a machine having a flat linear arrangement of fixtures rather than the rotary carousel 24.

The support frame 22 includes a semicircular-shaped track 28 for receiving the follower wheels (not shown) of the conveyor line. The track 28 is supported in the desired position by at least one upright leg 30 and a generally horizontal cross beam 32. As shown in FIG. 1, the bolt-in-slot connection 34 of the track 28 to the cross beam 32 allows for vertical adjustment of the track. A cylindrical stanchion 36 is rigidly mounted to the cross beam 32 to suspend downwardly therefrom. As indicated in FIGS. 1–2, the stanchion 36 defines the upright axis of rotation of the carousel 24.

An upper drive wheel 38 rotatably mounted to the stationary stanchion 36 is provided for transmitting movement of the conveyor line to the carousel 24. It will be appreciated that the conveyor line includes a number of spaced shackles carrying the carcasses by their hocks. The shackles are configured for engaging the periphery of the drive wheel 38 for rotating the wheel about the stanchion 36. The carousel 24 further includes a pair of vertically spaced annular disks 40 and 42 rotatably mounted to the stanchion 36. The fixtures 26 are connected between the disks 40,42 such that the disks are caused to rotate with one another. Additionally, the lower disk 42 is relatively larger than the upper disk 40 so that the fixtures, and thereby the carcasses, cant slightly outwardly and downwardly (see FIG. 1). A series of plastic wheels 44 rotatably mounted about the inner boundary of the lower disk 42 by bolt assemblies 46 bear against a circular plastic element 48 rigidly mounted to the stanchion 36. The upper disk 40 is rotatably mounted to the stanchion 36 by similar or other suitable means. The drive wheel 38 is fixedly connected to the upper disk 40 for transferring rotational movement of the wheel to the disks 40,42.

The fixtures 26 are essentially identical in construction. For the sake of brevity, the construction of only one fixture 26 will be described, with similar components among the fixtures being referenced by the same numeral. As shown in FIGS. 2 and 4, each fixture 26 generally includes a pair of upright, parallel, laterally spaced apart guide rods 52,54 that extend between the disks 40,42 of the carousel 24. The guide rods 52 and 54 are partly hollow to present respective vacuum cavities 56 and 57 therein that extend downwardly from the upper ends of the rods (see FIGS. 9 and 8 respectively). Each guide rod 52 and 54 has an elongated, outwardly facing opening 58 and 59 (see FIG. 2 for both openings 58,59, and particularly, FIGS. 6–8 for the opening 58) extending along the length thereof and communicating with the cavities 56,57, for purposes which will subsequently be described. As perhaps best shown in FIGS. 6–8, the cavities 56 and 57 terminate just below the openings 58 and 59. The lower end of the guide rods 52,54 are connected to the lower carousel disk 42 by bolt assemblies 63 (see FIG. 1). The upper ends of the guide rods 52,54 are received within circumferentially spaced holes defined in the upper carousel disk 40. The rods 52,54 carry two separate, vertically shiftable structures, namely a carcass supporting carriage 60 for supporting an individual poultry carcass and a vacuum tool 61 for removing the lungs from the carcass.

As shown in FIG. 1, the support carriage 60 comprises a block 62 that is slidable up and down along the guide rods 52,54 to the extent determined by a rearwardly disposed cam roller 64 received within a tracking guide 66 fixed to the stanchion 36 by radially extending supports 68. The block 62 carries with it a pair of upwardly and outwardly projecting stabilizer arms 70 that cooperate with a stationary leg spreader bar 72 fixed on the rods 52,54 above the block 62 to locate, orient and stabilize the poultry carcass as the lung removal operation is performed. The stabilizer arms 70 are secured to the block by a pair of fore-and-aft pivots 74 so that the stabilizer arms 70 can swing toward and away from one another about the pivots 74. Such pivoting movement of the arms 70 is controlled by a stationary cam plate 76 having inwardly opening notches (not shown) that slidably receive the lower ends of the arms so as to cam the upper ends of the arms toward and away from one another as the block 62 rises and falls on the guide rods 52,54. Further details of construction and operation of the support carriage 60 may be found in co-pending application Ser. No. 08/589,116, filed Jan. 19, 1996, entitled POULTRY PROCESSING MECHANISM HAVING CARCASS STABILIZER, assigned of record to the assignee of the present invention, said reference being hereby incorporated by reference as need be for a full and complete understanding of the present invention.

The vacuum tool 61 generally includes a support block 78 (e.g., see FIGS. 9–10) slidably mounted to the guide rods 52,54 and a suction assembly 80 (see FIG. 11) rigidly mounted to the support block 78 by a bolt assembly 82. The suction assembly 80 includes a mounting plate 84 abuttingly engaging the outer face of the support block 78. A bolt hole 86 defined centrally within the mounting plate 84 aligns with a corresponding hole (not shown) defined within the support block 78 for cooperatively receiving the bolt assembly 82. A pair of hollow suction tubes 88 and 90 project from the mounting plate 84 at locations aligned with elliptical openings 92 and 94, respectively. The suction tubes 88 and 90 are shaped to present respective proximal portions projecting obliquely from the support block 78, medial portions projecting generally downwardly from the proximal portions, and curved remote portions projecting inwardly from the medial portions to present respective inwardly facing intake openings 96 and 97, which in the illustrated embodiment are formed by the open ends of the tubes. As shown in FIGS. 6–9, the upper open ends of the suction tubes 88 and 90 communicate with upwardly and inwardly extending passageways 98 defined within the support block 78 (only one of such passageways being illustrated in FIGS. 6–8), for purposes which will subsequently be described. The suction assembly 80 is preferably formed of stainless steel, although other suitable materials, such as high strength plastic or aluminum, may be utilized if desired.

As perhaps best shown in FIGS. 10–11, the suction tubes 88,90 converge downwardly toward the intake openings 96,97, which facilitates insertion of the same into the body cavity of the poultry carcass. The intake openings 96,97 are ideally spaced for positioning on opposite sides of the backbone in overlying relationship with the membrane-covered sockets containing the lungs. A curved guide bar 100 connects between the tubes 88,90 in a position generally aligned with the medial portion of the tubes (see FIG. 9). The guide bar 100 serves several purposes, including straddling the backbone of the carcass to ensure alignment therewith and assisting with insertion of the tool 61 into the carcass by minimizing snagging of the tool on the portion of the carcass defining the vent hole. A second similarly configured bar 102 connects to the guide bar 100 at their common apexes and projects through the lower walls of the suction tubes 88,90 to present structure inside the tubes to break the membrane covering the lungs. In the illustrated embodiment, the structure comprises a pair of piercing teeth 104 and 106, the details of construction of which will be described hereinbelow.

Guiding apparatus, generally denoted by the numeral 108 (see FIG. 1), is provided for reciprocating the vacuum tool 61 up and down along the guide rods 52,54 through a number of operating strokes as the fixture 26 moves around the upright axis of the carousel 24. The apparatus includes a frusto-conically shaped drum 110 fixed to the upright stanchion 36 by suitable means. The drum 110 has an outwardly facing sidewall 112 which slopes downwardly and outwardly at substantially the same angle at which the fixtures 26 are canted (see FIGS. 1 and 6–9). A cam follower wheel 114 rotatably connected to the backside of the support block 78 by the bolt assembly 82 is received within an operating cam track 116 that extends around the sidewall 112. The cam track 116 is defined by a pair of substantially parallel plates 118 and 120 projecting from the sidewall 112. The plates 118 and 120 cooperatively limit up and down movement of the vacuum tool 61 to the extent that the plates rise and fall along the sidewall 112. As will subsequently be described, FIG. 4 depicts the region of the cam track 116 corresponding with the various operating strokes of the vacuum tool 61 as the lungs are removed, while FIG. 5 depicts the region of the cam track associated with the operating stroke of the vacuum tool 61 as the tool is washed between removal operations.

A vacuum control assembly, generally denoted by the numeral 122 (see FIG. 2), is synchronized with the vacuum tool guiding apparatus 108 (see FIGS. 4 and 5) for alternatively communicating the suction tubes 88,90 with a source of vacuum pressure (not shown) during certain operating strokes of the tool, as will subsequently be described. The control assembly 122 generally includes an annular manifold ring 124 (see FIG. 2) connected to the upper carousel disk 40 (see FIG. 1) for rotational movement therewith, and a stationary, arcuate vacuum block 126 rigidly secured to the upright leg 30 by suitable means (not shown). Accordingly, the manifold ring 124 moves relative to the vacuum block 126. As shown in FIGS. 7–9, the manifold ring 124 and vacuum block 126 are slidably and sealingly connected along their common boundaries by a pair of L-shaped, inwardly projecting retaining lips 128 extending along the length of the manifold ring 124 that are matingly received within corresponding channels 130 defined within the vacuum block 126.

Assuming the manifold ring 124 rotates in a clockwise direction viewing FIG. 2, each fixture 26 presents a leading guide rod 52 and a trailing guide rod 54. As shown in FIGS. 2 and 9, a diagonal passageway 132 aligned with the cavity 56 of the leading guide rod 52 extends upwardly and inwardly (leftwardly viewing FIG. 9) through the manifold ring 124. Similarly, a substantially vertical passageway 134 is aligned with the cavity 57 defined by the trailing rod 54.

The vacuum block 126 extends along a segment of the manifold ring 124, as shown in FIG.2, and presents a solid construction except for a pair of first and second hollow, elongated vacuum chambers 136 and 138. Each chamber 136 and 138 extends from the top of the vacuum block 126 and terminates short of the bottom of the block to present a bottom surface. A pair of elongated slots 140,142 and 144,146 defined within each vacuum chamber 136 and 138, respectively, extend generally vertically through the vacuum block 126 for intercommunicating the aligned passageways of the manifold ring 124 with the vacuum chamber. Assuming the manifold ring 124 rotates in a clockwise direction viewing FIG. 2, the slots of each chamber 136 or 138 are spaced along the path of movement of the ring, with the second slots 142 and 146 being spaced radially outwardly from the respective first slots 140 and 144. Particularly, the relatively inwardly spaced slots 140 and 144 serve to intercommunicate the leading guide rod 52 of a fixture 26 with the vacuum chambers 136 and 138, respectively; while the outwardly spaced slots 142 and 146 serve to intercommunicate the trailing guide rod 54 of the same fixture with the chambers 136 and 138, respectively, once the fixture has subsequently shifted into alignment therewith.

A pair vacuum hose connectors, generally denoted by the numerals 148 and 150 (see FIG. 3), are provided for connecting the respective vacuum chambers 136 and 138 (see FIG. 2) to a source of vacuum pressure (not shown). The connectors 148 and 150 include substantially flat mounting brackets 152,154 shaped to sealingly cover the open tops of the respective vacuum chambers 136 and 138. A plurality of holes 156 are spaced around each of the vacuum chambers 136,138, each of the holes 156 threadably receiving a corresponding fastening screw 158 for securing the connectors 148,150 to the vacuum block 126. The hose connectors 148 and 150 further include a pair of tubular elbow pipes 160 and 162 connected to the respective mounting brackets 152 and 154. The pipes 160 and 162 communicate with the vacuum chambers 136 and 138 via openings (not shown) defined in mounting brackets 152 and 154, respectively. It will be appreciated that the pipes are conveniently connected to flexible hoses (not shown) leading to the source of vacuum pressure.

The region of the cam track 116 corresponding with the various operating strokes of the vacuum tool 61 as the lungs are removed (see FIG. 4) is positioned generally below the vacuum block 126. In other words, the lung removal region of the cam track 116 and vacuum block 126 extend along substantially the same length of the conveyor line. Furthermore, the slots 140,142,144,146 and cam track 116 are arranged to alternatively communicate the suction tubes 88 and 90 with the source of vacuum pressure as the vacuum tool moves upwardly within the lung removal region of the cam track 116.

Particularly, as a fixture 26 moves with the manifold ring 124 in a clockwise direction viewing FIG. 2 (or leftwardly viewing FIG. 4), the cam track 116 initially extends downwardly so that the follower wheel 114 causes the vacuum tool 61 to slide downwardly on the guide rods 52,54. This initial stroke of the tool 61 corresponds with the tool being inserted through the previously cut abdominal opening of a carcass and into the body cavity, and will be referred to as the insertion stroke. Once the fixture reaches the first valley in the cam track 116, the passageways 98 defined within the support block are aligned with the elongated openings 58 and 59 defined within the guide rods 52 and 54 for intercommunicating the suction tubes 88 and 90 with the rod cavities 56 and 57, respectively. Furthermore, the diagonal manifold passageway 132 corresponding with the leading guide rod 52 aligns with the inner elongated slot 140 to intercommunicate the suction tube 88 with the first vacuum chamber 136 (see FIG. 9). As the cam track 116 extends upwardly causing an upstroke of the vacuum tool 61, the elongated opening 58 in the leading guide rod 52 and the elongated slot 140 in the vacuum block 126 ensure communication of the suction tube 88 with the first vacuum chamber 136 during substantially the entire upstroke of the vacuum tool 61. During this operating stroke, the manifold passageway 134 corresponding with the trailing guide rod 54 is blocked off for preventing communication of the trailing suction tube 90 with the vacuum chamber 136. The cam track 116 again extends downwardly to a second valley causing the vacuum tool 61 to downstroke as the fixture 26 moves around the machine 20, with both suction tubes 88,90 being blocked from communicating with the vacuum chamber 136. As the tool 61 makes its second upstroke, the vertical manifold passageway 134 corresponding with the trailing guide rod 54 aligns with the outer slot 142 of the first vacuum chamber 136 to intercommunicate the trailing suction tube 90 with the chamber 136 in a manner similar to the leading suction tube 88.

Similarly, the suction tubes 88 and 90 are alternatively communicated with the second vacuum chamber 138 during respective upstrokes of the vacuum tool 61. As will subsequently be described, this second pass within the poultry carcass further ensures removal of the lungs and facilitates removal of any remanent portions of the lungs or membranes leftover from the first pass. As shown in FIG. 4, a plateau is defined between the regions of the cam track corresponding with the first and second vacuum chambers 136 and 138 for spanning the relatively long solid portion of the vacuum block between the chambers. It will be appreciated that this solid portion minimizes the risk of bleeding between the vacuum chambers 136 and 138. The cam track 116 finally extends upwardly in the lung removal region thereof for defining a withdrawal stroke of the vacuum tool 61, in which the tool is withdrawn from the body cavity of the poultry carcass. During a portion of the withdrawal stroke, the trailing suction tube 90 of the corresponding fixture is communicated with the source of vacuum pressure.

As shown in FIG. 2, at any given time, only one of the guide rods 52 or 54 of a fixture 26 communicate with a corresponding vacuum chamber 136 or 138. Furthermore, the fixtures 26 are sufficiently spaced so that only one fixture communicates with each vacuum chamber 136 or 138 at a time, These features serve several purposes. First, the operating vacuum pressure requirements are reduced. Obviously, more than one suction tube communicating with a vacuum chamber 136 or 138 requires a greater source of vacuum pressure than only one tube communicating with the chamber, for a given pressure at the intake openings 96,97. Additionally, these features prevent untoward variations in vacuum pressure often caused by clogging or partial blockage of one of several tubes communicating with a vacuum chamber. With more than one suction tube communicating with one of the vacuum chambers 136 or 138, clogging or partial blockage of one of the tubes results in the other tube(s) being communicated with a greater vacuum pressure than desired, which may damage the carcass.

The vertical displacement of the operating strokes defined between the peaks and valleys of the cam track 116 are preferably 40 mm., which corresponds generally to the length of most membrane-covered sockets within chicken carcasses. The vertical displacement of the strokes may be varied to accommodate variously sized poultry carcasses simply by increasing the vertical distance between the peaks and valleys (the openings 58 and 59 defined within the guide rods 52 and 54 must also be lengthened). In this respect, the slope of the cam track 116 extending between a peak and valley must be increased for maintaining the desired duration of vacuum pressure. If desired, however, the duration of communication between each suction tube 88 or 90 and the source of vacuum pressure may also be varied. For example, to lengthen the duration of vacuum pressure, the cam track 116 extending between a peak and valley is lengthened, along with the slots defined within the vacuum chambers. This modification may be desired if the vacuum tool 61 makes only one pass within the body cavity of the poultry carcass.

Piercing Teeth 104,106

As previously indicated, inside each suction tube 88 and 90 adjacent the intake opening 96 and 97 is a piercing tooth 104 and 106, respectively, for breaking the membrane covering the lung. Particularly, each tooth 104 and 106 is defined by an end portion of the curved bar 102 (see FIGS. 11–14). The bar 102 is arranged so that the teeth 104 and 106 extend obliquely toward the respective intake openings 96 and 97. Specifically, the teeth 104 and 106 project upwardly from the lower boundary of the suction tubes 88 and 90 (see FIGS. 12 and 14). The apex of the bar 102 is secured by suitable means, such as welding, to the apex of the guide bar 100. In this respect, the curved bar 102 assists the guide bar 100 with facilitating insertion of the vacuum tool 61 into the body cavity of the poultry carcass and with positioning the tool across the backbone in overlying relationship with the membrane-covered sockets.

Each tooth 104 or 106 has a generally cylindrical shape with a beveled end to present a generally elliptical end face 104*a* and 106*a*. As perhaps best shown in FIG. 14, the intake openings 96,97 are substantially planar. In the illustrated embodiment, the end faces 104*a* and 106*a* are substantially parallel to the planar intake openings 96 and 97 and, more particularly, are spaced slightly inwardly from the openings (see FIG. 14). The teeth 104 and 106 further present respective uppermost sharp points 104*b* and 106*b* for piercing the membrane. The points 104*b* and 106*b* are defined along the upper marginal edge of the corresponding end faces 104*a* and 106*a*, and consequently, are also spaced slightly inwardly from the intake openings 96 and 97. However, the teeth 104 and 106 may be configured so that the sharp points 104*b* and 106*b* project slightly outwardly beyond the planar intake openings 96 and 97, respectively.

The sharp points 104*b* and 106*b* project or face generally upwardly, such orientation cooperating with the upward path of travel of the vacuum tool 61 during removal of the lungs to ensure breakage of the membrane. The ideal operation of the piercing teeth 104 and 106 is shown in FIG. 12, with particular reference to the trailing suction tube 90. Specifically, during an upstroke of the vacuum tool 61, the vacuum pressure within the suction tube 90 sucks the membrane M through the intake opening 97 and into engagement with the sharp point 106*b* of the tooth 106. The sharp point 106*b* pierces the membrane, exposing the interior of the socket S and the lung L to the vacuum pressure, whereby the lung L is sucked from the socket. It will be appreciated that the vacuum pressure also normally removes the membrane M.

Indeed, it is possible that the membrane M remains connected to the lung L so that both are sucked through the intake opening 97 and pierced by the tooth 106. Although this may tear the lung L causing the lung to fragmentize, the suction tube 90 of the illustrated machine 20 makes two passes with vacuum pressure over the socket S to ensure complete extraction of the organ. Furthermore, because the tooth 106 provides such ready and quick access to the interior of the socket S and lung L, the socket is usually exposed to the vacuum pressure for a sufficient period to ensure removal of all lung fragments. In any case, the piercing teeth have proven very effective in facilitating lung removal from the membrane-covered sockets.

Since the teeth 104 and 106 have proven so effective in assisting with removal of the lungs, the suction tubes 88 and 90 are devoid of scrapers or other projections extending outwardly from the tubes adjacent the intake openings 96 and 97. Additionally, the illustrated machine 20 is configured so that the suction tubes 88 and 90 do not contact the back B (see FIG. 12) of the poultry carcass, excepting the possibility of such contact when the vacuum tool 61 initially enters the poultry carcass through the previously cut abdominal opening. The cant of the poultry carcass as it is supported by the support carriage 60 is substantially parallel to the path of travel of the vacuum tool 61 and the suction tubes 88,90 are sufficiently spaced from the back B of the carcass for preventing untoward contact between the tool and carcass as the tool reciprocates up and down within the body cavity. That is to say, the present invention eliminates the need for scrapers and the need for contacting the poultry carcass with the tool 61, thereby reducing the risk of broken bones, splintered bone chips, and damage to other organs and body parts. In the illustrated embodiment, with the sharp points 104*b* and 106*b* of the teeth 104 and 106 being spaced inwardly from the intake openings 96 and 97, the teeth 104 and 106 are also prevented from contacting the back B of the bird.

Operation

The operation of the processing machine 20 should be apparent from the foregoing. Thus, suffice it to explain that a number of poultry carcasses are successively delivered to the machine by the conveyor line. The operable engagement between the shackles of the conveyor line and drive wheel 38 synchronize rotation of the carousel 24 with movement of the conveyor line so that each carcass is aligned with a fixture 26. As a carcass and corresponding fixture 26 move around the machine 20, the support block of the support carriage 60 is shifted upwardly along the guide rods 52,54 to cause the stabilize arms 70 to shift upwardly and swing toward one another. The arms 70 and spreader bar 72 cooperatively stabilize, orient and immobilize the carcass as the lung removal process is performed.

Subsequently, the vacuum tool 61 is inserted into the body cavity of the poultry carcass through the abdominal opening. Ideally, with the first upstroke of the vacuum tool 61, the lung underlying the leading suction tube 88 is removed. The tool 61 again shifts downwardly followed by another upstroke, in which the lung underlying the trailing suction tube 90 is removed. The vacuum tool 61 reciprocates up and down within the body cavity two more times, with each suction tube 88 and 90 making an additional pass over the respective sockets with vacuum pressure, before the tool is withdrawn from the carcass. It will be appreciated that soon after the vacuum tool 61 is withdrawn from the poultry carcass the support carriage 60 lowers so that the carcasses may be removed from the fixtures 26. Thereafter, the conveyor line disconnects from the machine 20.

A washing station, generally denoted by the numeral 164, is fixedly connected to the machine 20 at a generally diametrically opposed location from the vacuum block 126. In the usual manner, the washing station 164 flushes cleaning fluid downwardly through the passageways 132,134 defined within the manifold ring 124, into the cavities 56,57 of the guide rods 52,54, through the passageways 98 defined within the support block 78, and through the suction tubes 88,90. As previously indicated, the poultry carcasses are removed from the fixtures 26 before the same reach the washing station 164 so that the cleaning fluid discharged through the intake openings 96,97 does not contact the birds. The cam track 116 extends downwardly, as indicated in FIG. 5, to define a washing region corresponding with the washing station, in which the elongated openings 58,59 of the guide rods 52,54 are aligned with the passageways 98 of the support block 78 to allow cleaning fluid flow through the suction tubes 88,90. The washing region of the cam track 116 is positioned along the drum 110 generally below the washing station 164.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the piercing teeth 104,106 of the present invention may be provided on other variously constructed processing machines. It is possible for the piercing teeth 104,106 to be utilized on a hand-held vacuum tool. Additionally, the sharp points 104b, 106b of the piercing teeth are illustrated in an upwardly facing or projecting orientation for countering the upward travel of the vacuum tool 61 during removal of the lungs. The principles of the present invention are equally applicable to a piercing tooth that is substantially perpendicular to the planer intake openings with a centrally disposed, outwardly facing point. Furthermore, the kidneys of poultry carcasses are also disposed within membrane-covered sockets. Accordingly, the principles of the present invention are equally applicable to extraction of kidneys from the poultry carcass.

The inventors hereby state their intent to rely on the Doctrine of Equivalents for determining and assessing the reasonably fair scope of the present invention as pertains to any apparatus not materially departing from but outside the literal scope of the invention as set forth in the following claims.

What is claimed is:

1. In a poultry processing machine having a suction tube for use in extracting an organ from a membrane-covered socket in the body cavity of a poultry carcass, said tube having an intake opening, the improvement comprising:

a stationary sharp element fixed inside said tube and disposed for breaking the membrane during extraction of the organ.

2. In a poultry processing machine having a suction tube for use in extracting an organ from a membrane-covered socket in the body cavity of a poultry carcass, said tube having an intake opening, the improvement comprising:

structure inside said tube disposed for breaking the membrane during extraction of the organ, said structure comprising a tooth having a sharp point for piercing the membrane.

3. In a poultry processing machine as claimed in claim 2, said point being disposed for piercing the membrane when the membrane is sucked into the tube through the intake opening.

4. In a poultry processing machine as claimed in claim 2, said tooth being generally cylindrical with a beveled end to present a generally elliptical end face, said sharp point being positioned along the marginal edge of the end face.

5. In a poultry processing machine as claimed in claim 2, said suction tube having an open planar end defining said intake opening, said tooth having a substantially flat end face, with the sharp point being positioned along the marginal edge of the end face, said end face being substantially parallel to said open end.

6. In a poultry processing machine as claimed in claim 5, said end face of the tooth being spaced inwardly from the planer open end of the suction tube.

7. In a poultry processing machine as claimed in claim 2, said tube having a generally upward path of travel during extraction of the organ, said sharp point projecting generally upwardly.

8. In a poultry processing machine as claimed in claim 1, said tube being devoid of projections extending outwardly from the intake openings.

9. In a poultry processing machine as claimed in claim 1, said suction tube having an open end defining said intake opening.

10. In a poultry processing machine for removing lungs from the body cavity of poultry carcasses as the carcasses are suspended by their hocks from an overhead conveying line, the improvement comprising:

a stationary support;

a carousel mounted on said support for rotation about a generally upright axis in coordination with the conveying line;

a plurality of carcass fixtures mounted on said carousel at spaced locations around the periphery of the carousel for receiving carcasses in succession from the conveyor line and performing a lung removal operation on the carcasses as the fixtures move about said upright axis, each of said fixtures including mechanism for immobilizing a carcass as the lung removal operation is performed and a vacuum tool connectable with a source of vacuum pressure and usable within the body cavity while the carcass is immobilized;

apparatus for reciprocating the tool of each fixture through a number of operating strokes as the fixture moves around the axis; and vacuum control means synchronized with said apparatus for communicating each tool with the source of vacuum pressure during certain of the operating strokes of the tool, each of said tools including a pair of suction tubes having a corresponding pair of intake openings, each of said tools further including a sharp tooth inside each tube for facilitating removal of the lungs.

11. In a poultry processing machine as claimed in claim 10, said tooth being generally cylindrical with a beveled end to present a generally elliptical end face, said tooth presenting a point positioned along the marginal edge of the end face.

12. In a poultry processing machine as claimed in claimed 10, said suction tubes having a corresponding pair of open planar ends defining said intake openings, said tooth having a substantially flat end face substantially parallel to the corresponding open end.

13. In a poultry processing machine as claimed in claim 12,
   said end face of the tooth being spaced inwardly from the corresponding planer open end.

14. In a poultry processing machine as claimed in claim 12,
   said tubes having a generally upward operating stroke during extraction of the organ,
   said tooth presenting a sharp point projecting generally upwardly.

15. In a poultry processing machine as claimed in claim 10,
   said tubes being devoid of projections extending outwardly from the intake openings.

16. In a poultry processing machine as claimed in claim 10,
   said suction tubes having a pair of corresponding open ends defining said intake openings.

* * * * *